Aug. 21, 1962     W. GÖRNER ETAL     3,050,246
READ-OUT APPARATUS FOR AN ACCOUNTING MACHINE
Filed April 18, 1958                              9 Sheets-Sheet 1

Aug. 21, 1962 W. GÖRNER ETAL 3,050,246
READ-OUT APPARATUS FOR AN ACCOUNTING MACHINE
Filed April 18, 1958 9 Sheets-Sheet 9

INVENTORS
WOLFGANG GÖRNER
RENATE KLUGE

United States Patent Office 3,050,246
Patented Aug. 21, 1962

3,050,246
READ-OUT APPARATUS FOR AN ACCOUNTING MACHINE
Wolfgang Görner and Renate Klüge, Karl-Marx-Stadt, Germany, assignors to VEB Buchungsmaschinenwerk Karl-Marx-Stadt, Karl-Marx-Stadt, Germany
Filed Apr. 18, 1958, Ser. No. 729,389
Claims priority, application Germany June 6, 1957
12 Claims. (Cl. 235—61)

This invention relates to a device for the pulsed transmission or read-out of values from a mechanical or electromechanical calculating or accounting machine to an electronic storage device and vice versa.

When a mechanical accounting machine is associated with an electronic computer, the values entered in the accounting machine or calculated by it must be transferred to an electronic multiplying device in the form of factors. The value stored in the accounting machine by the angular position of notched wheels or racks must be converted into pulses that are transmitted to an electronic or magnetic storage in the multiplying device, being stored there until multiplication is performed. Furthermore, after the multiplication has been completed, the product must be transmitted to the accounting machine for further processing or for printing, the value consisting of a certain number of pulses being reconverted into a corresponding angular position of notched wheels or racks.

Known devices of this sort are equipped with a pulse transmitter which transmits a number of pulses corresponding to a quantity when this quantity is transmitted to an electronic storage device, these pulses traveling along wires to an electronic storage and stepping the latter pulse by pulse. A quantity is read out from the electronic storage by having a number of pulses, corresponding to the base number employed, enter the electronic storage from the same pulse transmitter or from another one, this pulse group thus being further stepped up beyond the quantity contained in the storage, thus exceeding the latter's counting or storing capacity. The electronic storage is so designed as to emit a transfer pulse when its capacity is exceeded, this pulse serving in the accounting machine to actuate electromagnetically blocking devices for the operation of calculating members, such as racks. The calculating members are thus set to the complementary value of the number to be transmitted with respect to the base number employed, which is then registered as the actual value after appropriate conversion.

The pulse transmitter consists either of electronic tube circuits that are so designed as to automatically generate a selectable number of pulses, or else of mechanically actuated contacts, the closing of the contacts, say, in an accounting machine being effected by racks serving for transmitting quantities or by members coupled to these racks. In the example last mentioned, the racks have teeth that make contact with springs when they are displaced through a distance corresponding to transmission of a quantity, so that a number of pulses corresponding to the transmitted value or, if the racks travel through their entire length, a number of pulses corresponding to the base number employed is generated. The blocking devices for the racks that are actuated by the transmitted pulses when a quantity is transmitted from the electronic storage device to the accounting machine are designed as levers or slides directly connected with the armatures of electromagnets, these levers or slides serving as stops for the sliding racks.

The disadvantages of the devices referred to are that electronic pulse transmitters are very expensive while chatter normally occurs when mechanically actuated contacts operate, resulting in an uncontrollable generation of high-frequency pulses and thus in a falsification of the quantity to be transmitted. Another disadvantage is the fact that the blocking members connected to the armatures of electromagnets act directly as stops for the racks, so that they must be of sturdy design and hence do not permit of rapid motion in the locking position when normal force is applied, owing to their great inertia.

It is the object of this invention to create an apparatus that avoids these disadvantages, with which reliable transmission of quantities is feasible at low costs between a calculating or accounting machine and an electronic storage unit. This is achieved in the invention by providing a contact ball in an insulating cage between the contact springs and the contact teeth of the racks for each rack moving in conformity with the quantity during a transmission cycle, and by fastening insulating plates at both sides of the racks that project above the contact teeth to guide the contact balls during the making of contact. Furthermore, a delay coupling drive is also provided for driving the segments assigned to the individual digital positions with a delay relative to the movements of the cam plates of a pulse generator, these segments each being provided with a set of ratchet teeth and a set of standard gear teeth. The gears that mesh with the standard gear teeth, which are provided with a detent and resemble a counting wheel, being hinged for meshing with the racks.

Another feature of the invention is the provision of zero stop members, which lie within range of the detents after the gears are swung into mesh with the racks, for checking the racks after they have completed the travel corresponding to the set quantity, constituting a stop for the detent projecting on the gears.

An embodiment of the device of this invention is shown and described in the drawings and in the following descripiton.

Figure 1:
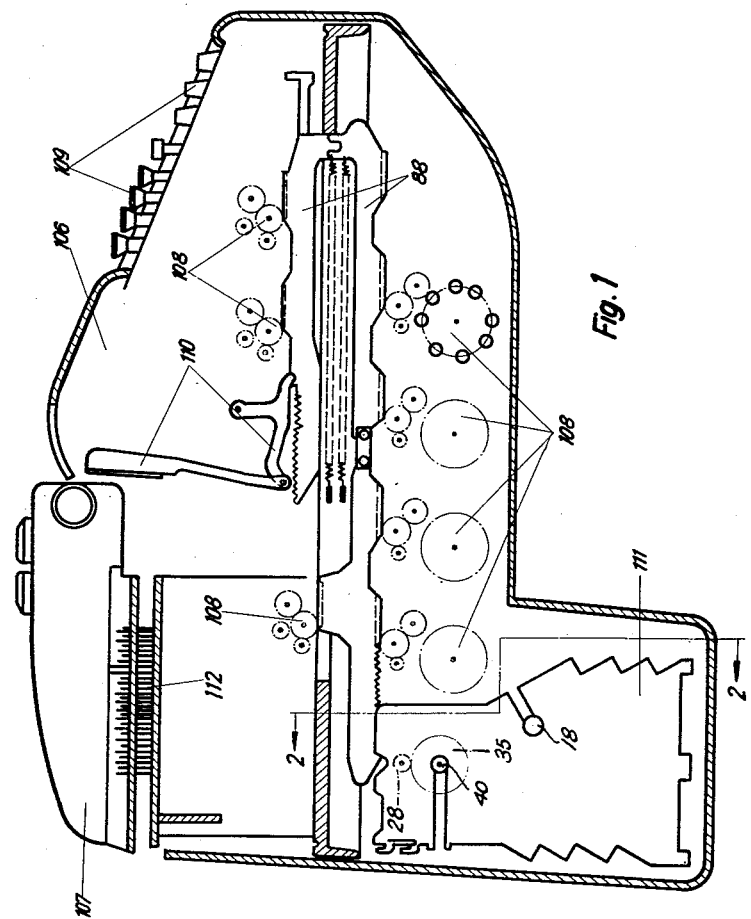
FIG. 1 is the schematic drawing of an accounting machine with a read-out apparatus according to the invention for transferring quantities to an electronic storage device.

Referring now to the drawings, the apparatus shown by way of example serves to transmit quantities between a mechanical accounting machine and an electronic computer. Both machines work on the decimal system, though the invention is not limited to this system of numbers.

Figure 3:
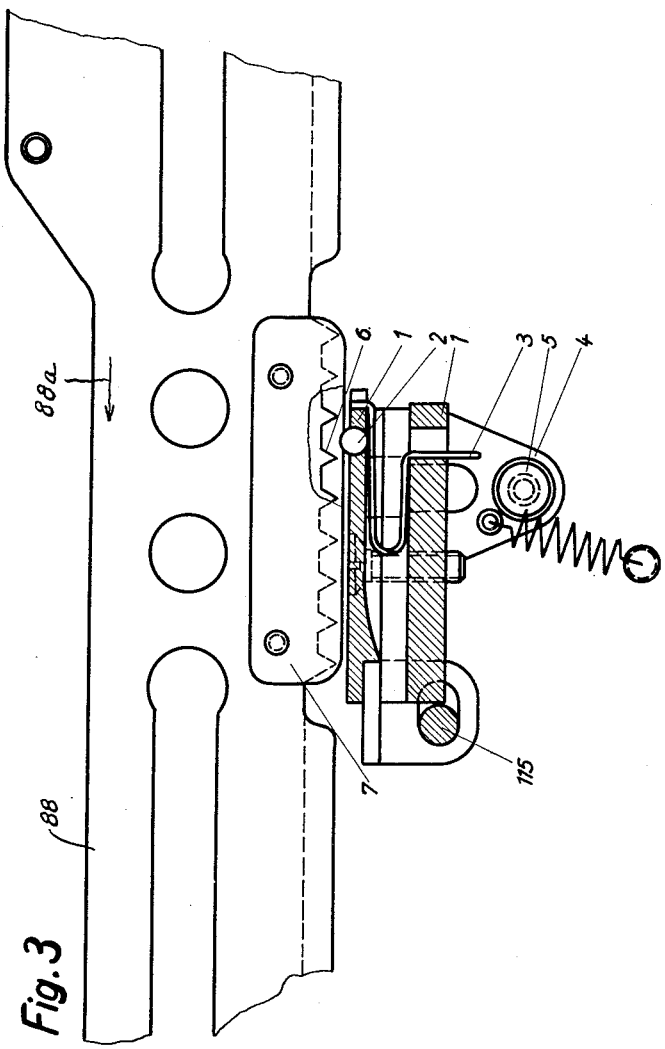
FIG. 3 is a sectional view along the line 3—3 of FIG. 2.
Figure 4:
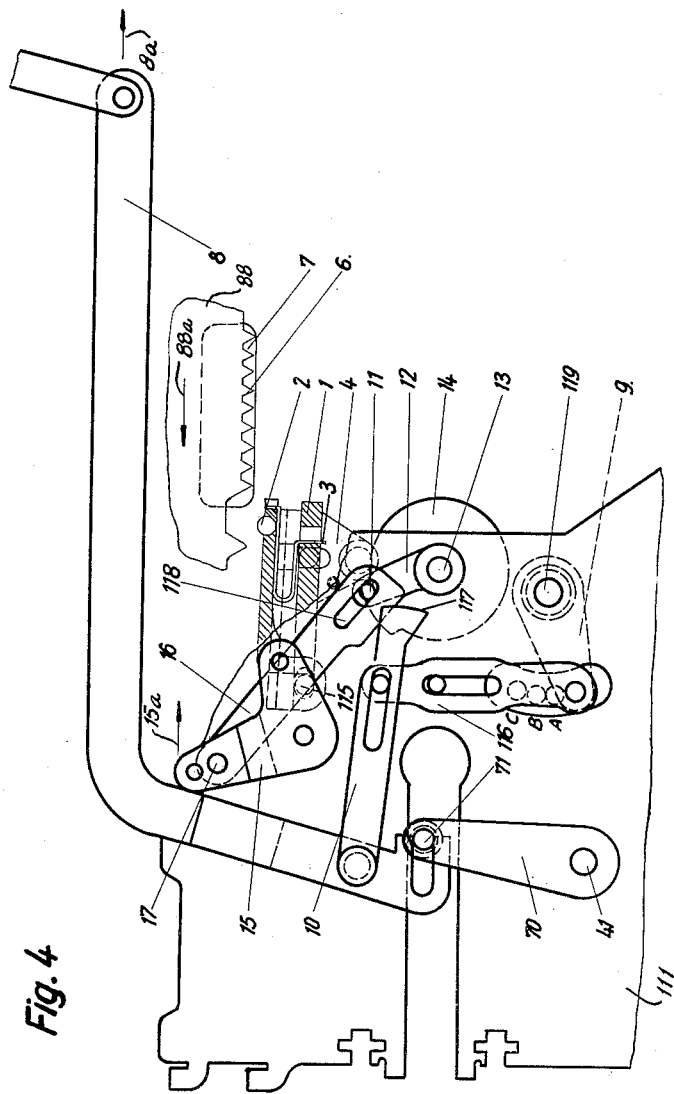
FIG. 4 is a view in the direction B and showing a detail of FIG. 2.

A housing 111 is located beneath racks 88 at the rear of the machine in an accounting machine 106 (FIG. 1) of the usual design having a movable paper carriage 107, a keyboard 109, with longitudinally displaceable racks 88 for the individual digital positions, which are connected to counters 108, a function-control section 112, and a printing device 110. In the housing 111 (FIG. 2), which has side walls 113 and cross-pieces 114, there is mounted a shaft 115 (FIGS. 3 and 4) which carries a hinged frame 4 with a ball cage 1 made of insulating material. There are holes in the ball cage in which there are contact balls 2 assigned to the several racks 88 and resting on the contact springs 3.

The frame 4 is fitted with rollers or cam followers 5 that make positive contact with a cam plate 14. The cam plate 14 is fastened on a shaft 13 running in bearings in housing 111. The cam plate is so designed that as it turns it swings frame 4, thus bringing the contact balls 2 within range of contact teeth 6 located on the racks 88. Two insulating plates 7 fastened at either side of the racks 88 and projecting above the contact teeth 6 serve as guides for the contact balls 2 when the contact balls 2 are within range of the contact teeth 6 and the racks 88 execute a longitudinal motion during a transmission cycle.

Since the racks 88 are at zero potential via flexible cables, and the contact springs 3 are connected to the individual pulse lines, as will be described in detail subsequently, whenever a contact tooth 6 of a rack 88 makes brief contact with the assigned contact ball 2, it generates a pulse that has the value of "1" and serves to transmit this value from the accounting machine to the electronic storage device.

At the upper left of the housing 111, there is the control mechanism for the swinging of frame 4. If a quantity is to be transmitted from the accounting machine to the storage unit of the electronic computer, the frame 4 together with the ball cage 1 must be rotated by turning the cam plates 14 so as to bring the contact balls 2 within the range of the contact teeth 6. For this purpose, a member 10 is hinged to a connecting member 8 which in turn is connected to the accounting-machine drive and is moved in the direction of the arrow 8a when the racks 88 have reached a setting corresponding to the value set on the keyboard 109 and printing is to occur. The member 10 is pivoted through a connecting member 116 by a drive 9 which is mounted on a function shaft 119, so that its end surface 117 enters within range of a pin 11, which is attached to a driver 12 fastened on shaft 13.

A lever 15 which is tilted in the direction of the arrow 15a at the start of an accounting operation by the accounting-machine drive, is connected by a stud 17 with a locking member 16 in which there is an elongated hole 118 into which the stud 11 projects. The locking member 16 serves to prevent rotation of shaft 13 and hence to prevent the movement of the contact balls 2 within range of the contact teeth 6. At the start of an accounting operation, the stud 11 is released by the locking member 16 owing to the turning of lever 12 in the direction of the arrow, so that after the advance of the racks 88 is complete, the movement of the connecting part 8 via member 10 makes it possible for shaft 13 to turn, thus bringing the contact ball 2 into position for making contact. During the return of the racks 88, pulses are then generated on pulse lines 160 to 165, corresponding in number to the values to which the several racks are set.

Figure 2:
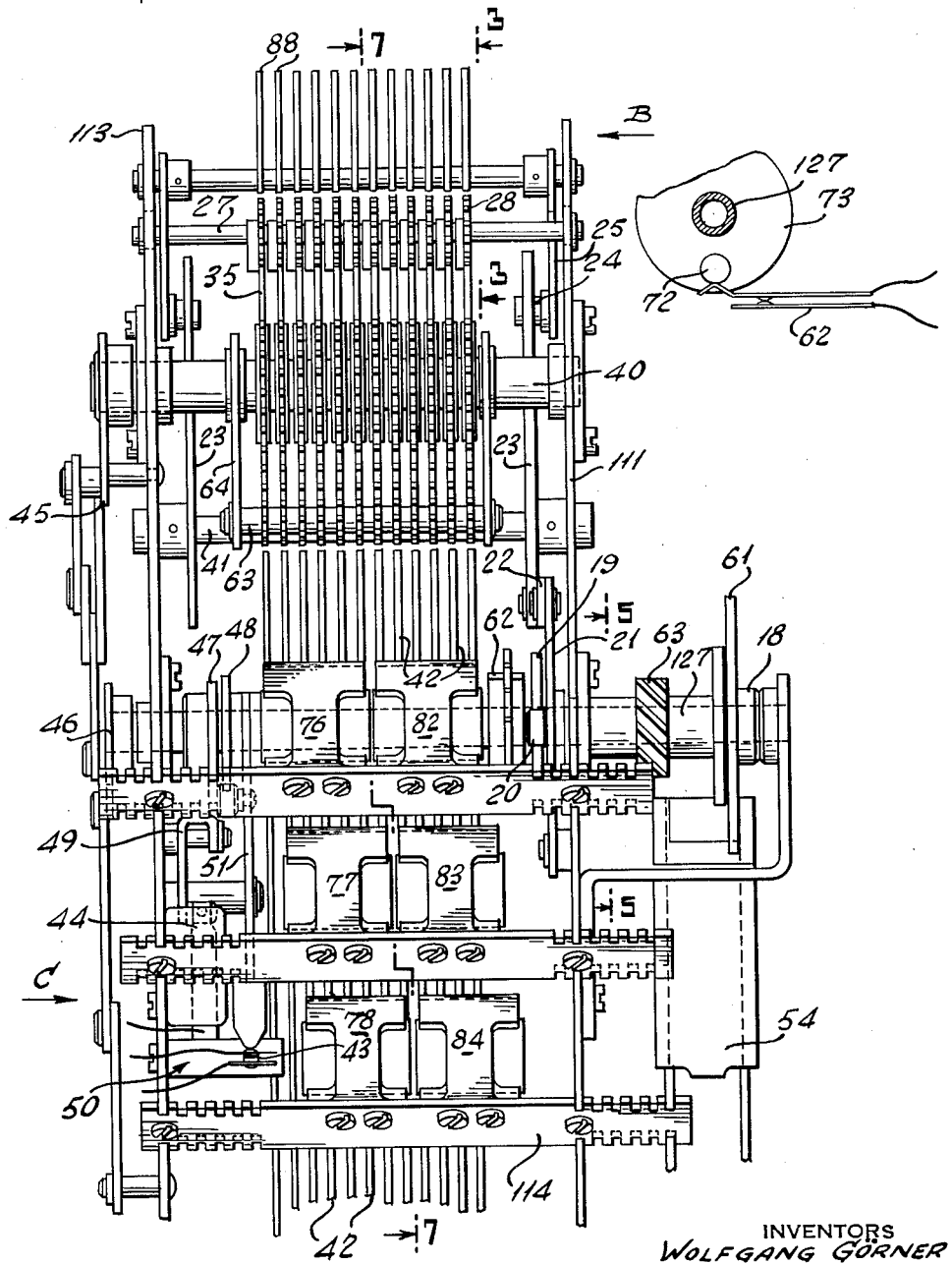
FIG. 2 is a sectional view along the line 2—2 of FIG. 1.
Figure 5:
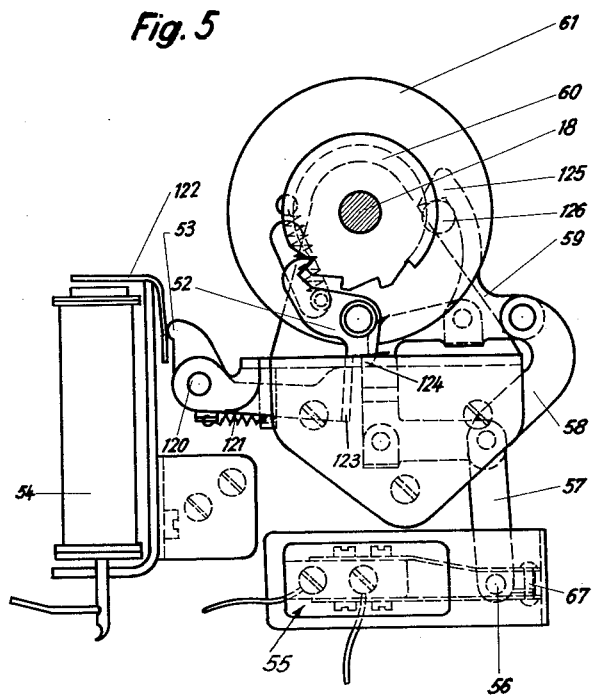
FIG. 5 is a sectional view along the line 5—5 of FIG. 2.

A shaft 18 (FIG. 5), running in bearings in housing 111, upon which a driving disk 61 is mounted, is provided for producing the control movements required for a transmission. A pawl 52, acting radially, is attached to the drive disk 61 and engages positively in a sprocket 60 mounted on a hollow shaft and driven by the accounting-machine drive via a driving gear 63 (FIG. 2). A connecting member 53 which is hinged on a stud 120, is urged against an armature 122 of an electromagnet or relay 54 by a spring 121. An angle 123 of the connecting member 53 keeps the pawl 52 disengaged from the sprocket 60 when at rest, preventing drive disk 61 from turning clockwise. A lever 57 whose lug 124 abuts against the angle 123, has a stud 56 made of insulating material, which enters between two contact springs of a contact 67, keeping the latter open when at rest. An intermediate member 58 is also hinged to lever 57 and is hinged at its other end to a detent 59.

Whenever the electromagnet 54 is energized, its attraction of the armature 122 turns the connecting member 53, thus releasing the pawl 52 from the angle 123 and allowing it to mesh with the sprocket 60. At the same time, the lug 124 of lever 57 is released, turning the latter counterclockwise, thus closing contact 67 of a switch 55 and causing the detent 59 with its projection 125 to enter the range of a stud 126 mounted on the drive disk 61. Once the drive disk, driven by the sprocket 60, has made one revolution, the pin 126 strikes the projection 125, turning the detent 59 clockwise and reopening contact 67 via the intermediate member 58 and the lever 57.

Figure 6:
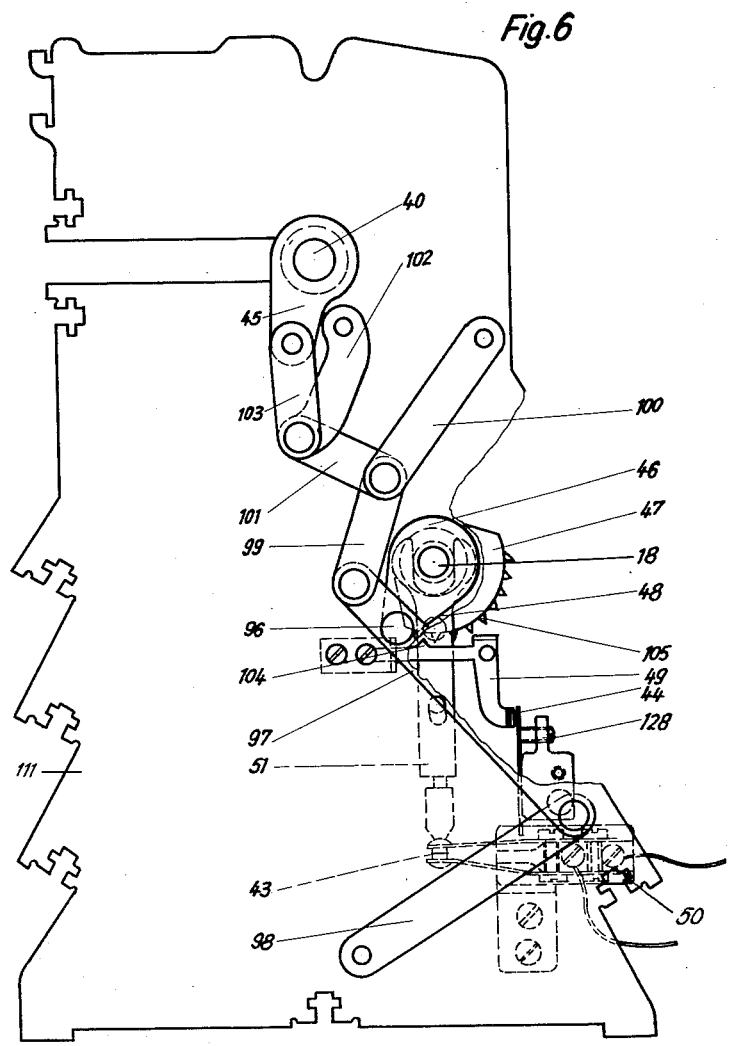
FIG. 6 is a detailed view in the direction C of FIG. 2.

A cam 48, mounted on shaft 18, opens and closes a contact 43 of a switch 50 via a switching bar 51 (FIG. 6). A cam plate 47 with ten teeth 105 spaced around its periphery is likewise mounted on shaft 18. A bell crank lever 49, at zero potential, which makes contact when tilted with a contact spring 44 that can be adjusted by a screw 128, has a lug 104 that projects into the region of the teeth 105. A crank 46 fastened on shaft 18 acts as the driving member for a delay coupling drive that serves to drive segments 35 mounted on a shaft 40. The delay coupling drive is located at the left side of the housing 111 and consists of a rocker arm 98, coupling members 97, 99, 101, and 103, rocker arms 100 and 102, a driven member 45, the crank 46, and the housing 111, which acts as the stationary member. The several links are connected together by joints, the crank 46 being hinged to the coupling member 97, and the driven member 45, which is mounted on shaft 40, being hinged to the coupling link 103. The lengths of the links are chosen so that the driven shaft 40 turns during one rotation of shaft 18, coming to rest at a final position that lies at the beginning of its rotational movement at a certain angle of rotation of shaft 18.

Figure 7:
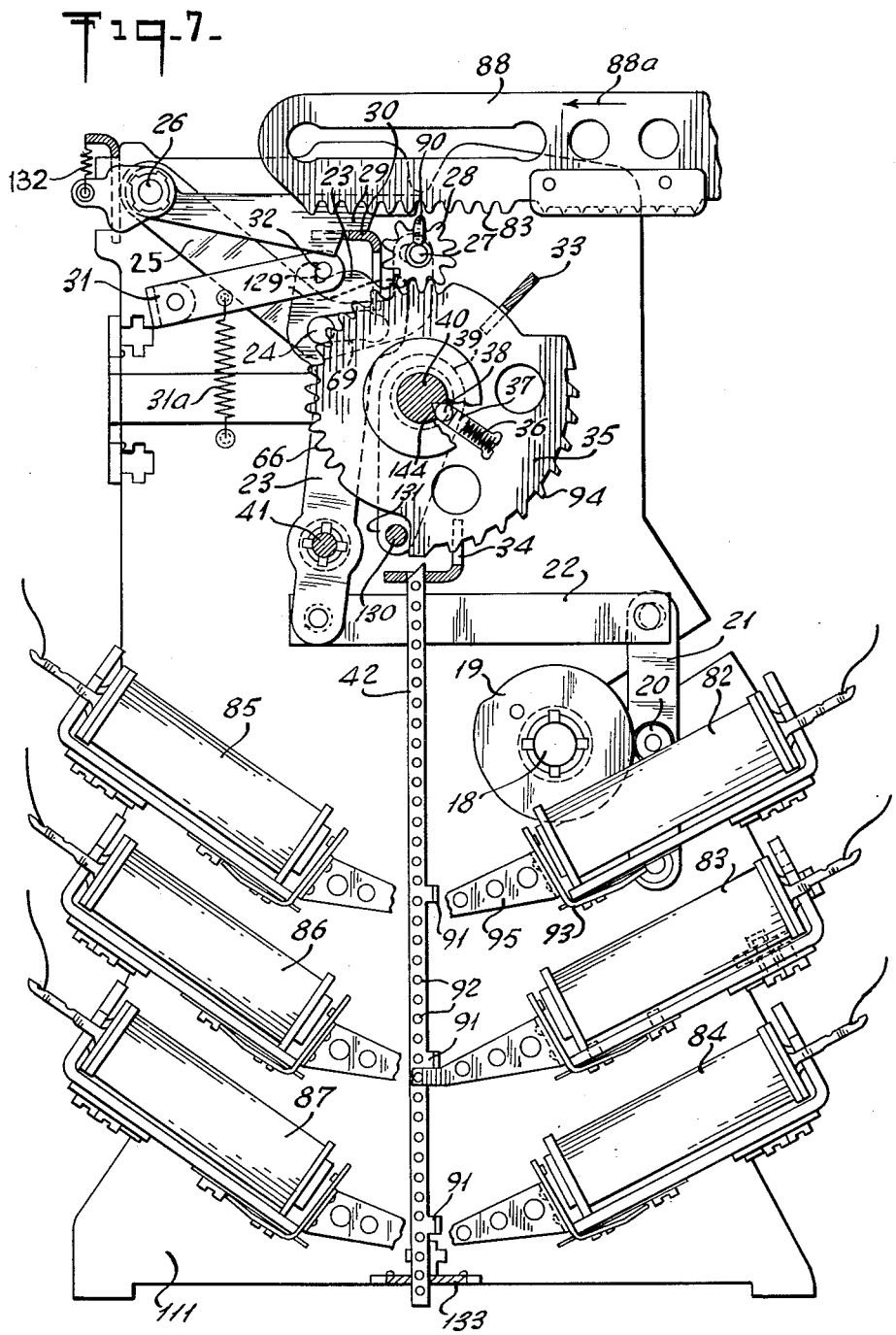
FIG. 7 is a sectional view along the line 7—7 of FIG. 2.

The segments 35 guided laterally by combs 33 and 30 are mounted on shaft 40 and may be positively locked against turning (FIG. 7). A spring 36, which presses a disk 38 into a keyway 144 of shaft 40 via pressure pins 37, is located in a recess of segments 35. Disk 38 and the pressure pin 37 are held in position by rings 39 fastened on either side of the segments 35. The segments 35 are provided with ratchet teeth 94 and normal gear teeth 66. Gears 28, which resemble the counter wheels employed in calculating machines, engage the latter gearing 66 in the position at rest. The gears 28 have ten teeth and a projecting detent 90 and are assigned to the several racks 88 like the segments 35. The gears 28 rotate on a shaft 27 which is mounted in bearings in the hinged support 25. The gears 28 are swung into place by a cam drive.

A cam 19, mounted on shaft 18, actuates levers 23 which are mounted on a shaft 41 at both sides of the housing 111 (FIG. 2) and are provided with cams 69, during one revolution of shaft 18 via a roller 20, a lever 21 and a link 22. Rollers 24 which are fastened to supports 25, engage the cam 69. There are recesses 129 in the lever 23, which are engaged by a stud 32 of a ratchet link 31 which is pressed against lever 23 by the force of a spring 31a. When shaft 18 makes one revolution, the turning of lever 23 produces pivoting of the gears 28, corresponding to the course of the cam 69, the gears 28 disengaging from the segments 35 and meshing with the racks 88.

Zero stop members 29, mounted on a shaft 26, and which are assigned to the several gears 28, constitute a stop for the projection 90 as the gears are turned by travel of the racks 88. The zero stops 29 are urged towards the comb 30 by springs 132. Below the segments 35 locking slides 42 are arranged, assigned to the several segments 35, so as to be longitudinally movable, guided by a comb 34 and a sheet metal support 133. Inside the housing 111 there are electromagnets or relays 76 to 87, which have hinged armatures 93, to which intermediate links 95 made of non-magnetic material are attached. The intermediate links 95 engage the locking slides 42 underneath angles 91, each locking slide 42 having one of the electromagnets 76 to 87 assigned to it.

When one of the electromagnets 76 to 87 is energized, attraction of its armature 93 pushes the corresponding locking slides 42 upward, causing it to engage the ratchet teeth 94 of the corresponding segment 35, preventing the latter from participating in the turn made by shaft 40 during one revolution of shaft 18. This forces the disk 38 out of the keyway 144 of shaft 40, so that the shaft 40 can be turned further, while the corresponding segments 35 are locked. As shaft 40 turns back to its initial position, the rotated segments strike the comb 33 and are thus returned to their position of rest.

Figure 8:
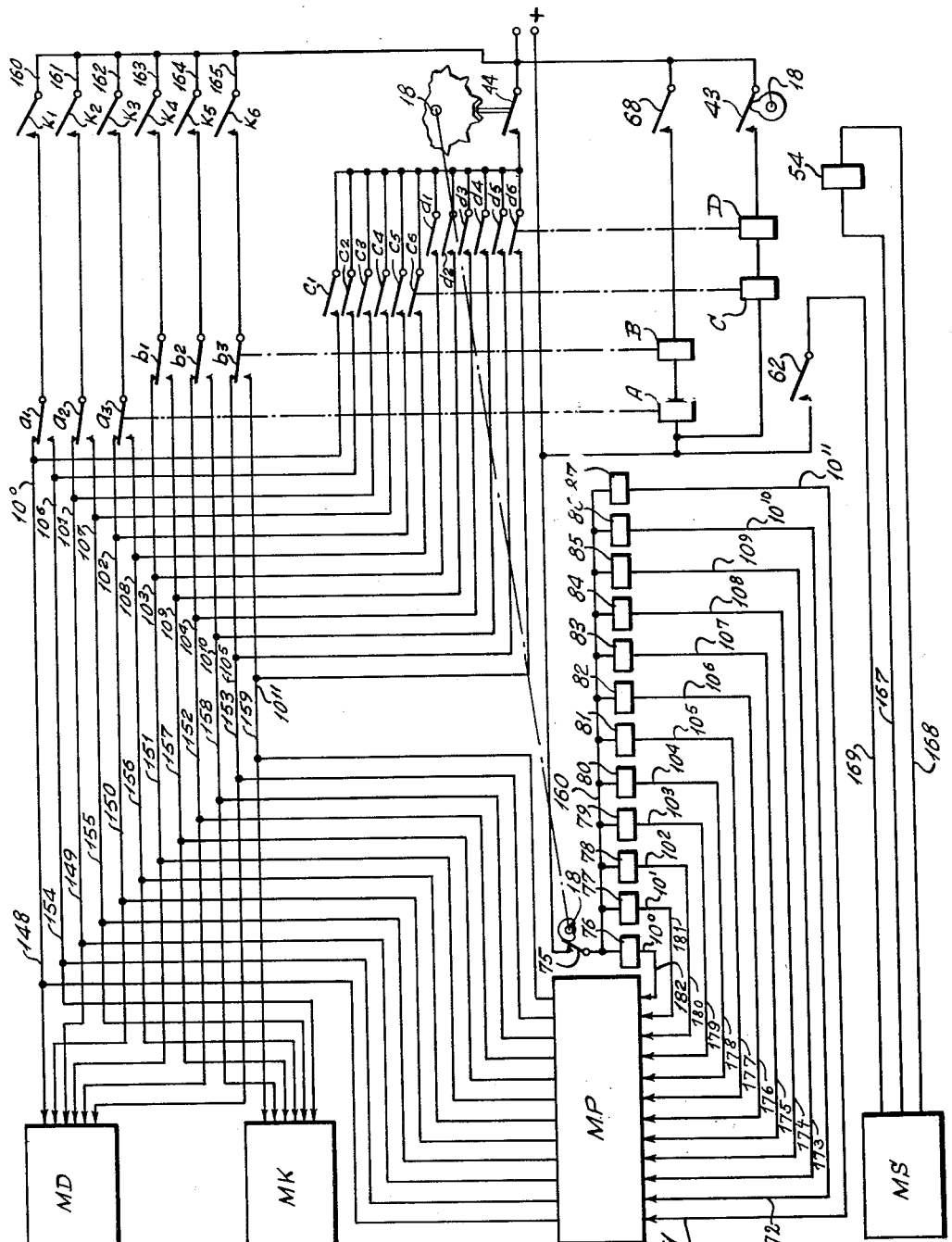
FIG. 8 is a circuit diagram of the read-out apparatus with a schematic of the connection to an electronic multiplication device.

The diagram of FIG. 8 shows the cooperation of the read-out apparatus with the electronic computer. The computer C includes a multiplication control unit MS, a multiplicand storage unit MD, a multiplier storage unit MK and a product storage unit MP. Each of these units consists of a number of decade counters of known design, which are connected in series.

Figure 9:
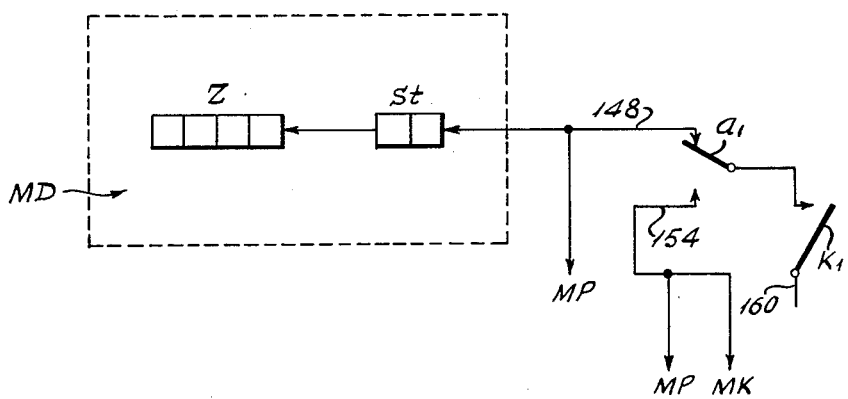
FIG. 9 is a block diagram of a multiplicand storage unit.
Figure 10:
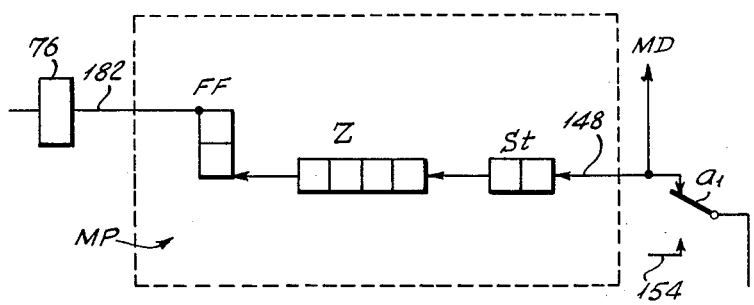
FIG. 10 is a block diagram of a product storage unit.

FIGS. 9 and 10 show in simplified block form an arrangement having only one counter in each of the units MD and MP. The number of counters may vary and does not form the subject matter of the invention.

FIG. 9 shows the corresponding connection of the multiplicand register MD, as a matter of example, with a pulse line 148. The same type of arrangement forms the multiplier register MK which is associated, however, as a matter of example, with an input line 154. The line 148 and lines 149–153 are associated, as shown in the wiring diagram of FIG. 8, with the multiplicand register MD, and the line 154 as well as lines 155–159 with the multiplier register MK.

According to the example in FIG. 9, a counter Z in the register MD receives pulses through a Schmitt trigger switch or gate stage $St$ which is arranged between the line 148 and the counter Z to suppress any contact chatter that might exist. The pulses correspond in this case to the last value position of the amount keyed into the accounting machine. The lines 148–153 and 154–159 are associated with pairs of contacts $a1-a3$ and $b1-b3$, respectively. In the rest position of these contacts, there is a connection to the lines 148–153 and also to the multiplicand storage MD.

As previously mentioned and as shown in the wiring diagram (FIG. 8), lines 148–153 and 154–159 are connected, via contacts $a1-a3$ and $b1-b3$, with the ball contacts $K1-K6$ which are actuated by the racks 88 and are identical to those actuated by contact ball 2 and the contact piece 6. Thus when the ball contacts $K1-K6$ are closed, and connected to zero potential through the lines 160–165, pulses can be fed into the multiplicand storage MD or into the multiplier storage MK.

FIG. 10 shows the entry of a pulse from line 148 into the product storage MP, this line being similarly associated with a trigger or gate stage $St$ and a counter Z. When the latter is filled to capacity, the relay 76 is then actuated through a flip-flop circuit FF and a line 182. Connected to the pulse lines 148–159, and associated with the product storage MP, are an equal number of leads, including lines 171–181, as well as the above-mentioned line 182, which in turn are connected with the relays 76–87.

The cam-actuated contact 43 is positioned in the circuit of two relays C and D which actuate the contacts $c1-c6$ and $d1-d6$. These contacts, when in closed position, connect all the pulse lines together. In this case pulses can be transmitted to all pulse lines 148–159 by contact 44 which is connected in series with the contacts $c1-c6$ and $d1-d6$.

Multiplication is started by the closing of a contact 62 which is controlled by element 112 of the accounting carriage 107. Contact 62 cooperates with a pin 72 which is secured on a disk 73 mounted on a hollow shaft 127, as shown in FIG. 2. The contact 62 is connected through a positive potential line 169 with the multiplication control unit MS and transmits a starting pulse to the multiplication control unit, in conjunction with the corresponding program control of the accounting machine. At the end of the multiplication, which occurs within a few milliseconds in electronic computers, the relay 54 is energized by a pulse from the multiplication control unit MS via lines 167 and 168 to start the last process of transferring a product from the product storage unit MP into the accounting machine.

The mode of operation of the device will be described below, using as an example a transfer of quantities as factors for a multiplication from the accounting machine to the electronic computer and a retransfer of the resultant product to the accounting machine. We shall use the quantity "6666" as the multiplicand and the quantity "77" as the multiplier.

After the factor "6666" has been entered in the keyboard 109 of the accounting machine 106, the racks 88 are displaced in the usual manner, the racks 88 assigned to the digital places of the keyed number being set to the position "6," while the other racks 88 remain in their position of rest. While the accounting-machine carriage 107 moves to the column in which the initial factor is to be printed, the control unit 112 of the accounting machine, which is set for multiplication, turns a function shaft 119 (FIG. 4) to position A, which causes the accounting machine to transmit the quantity keyed and to be printed in this column to the electronic computer.

While printing is done by the printing mechanism 110, the connecting member 8 is simultaneously moved in the direction of the arrow 8a, causing the link 10 to engage pin 11 and turn the lever 12 which was released at the beginning of the machine operation by the turning of lever 15. Frame 4 is turned by the cam 14, so that the contact balls 2 come within range of the contact teeth 6. During the ensuing return of the racks 88, six pulses are generated by each of the displaced racks 88 which enter the multiplicand storage unit MD, since the respective contact springs 3 are connected to the pulse paths 148–153 through the contacts $a1-a3$ and $b1-b3$.

After the racks 88 have reached their initial position, lever 15 is turned to its position of rest, thus turning cam 14 back through the links 16, 11, 12 and 13, so that frame 4 also returns to its position of rest. As soon as the machnie operation is completed, the accounting-machine carriage 107 jumps to the next column, the control unit 112 then turning the function shaft 119 to position B for transmitting the second factor. In addition, a contact 68 is closed in this column by the means provided in the control unit 112, thus energizing the relays A and B and throwing the contacts $a1$ to $a3$ and $b1$ to $b3$. Now the contact springs 3 are connected to the multiplier storage unit MK via the pulse paths 154 to 159.

After the multiplier "77" has been entered into the keyboard 109, the multiplier is transferred to the multiplier storage unit MK of the electronic computer in a manner analogous to the transmission of the multiplicand. This completes transmission of the factors in the electronic storage device. The multiplicand storage unit now contains the value "6666" and the multiplier storage unit the value 77.

As the accounting-machine carriage 107 jumps to the next column, control section 112 closes contact 62 which is connected to the multiplication control unit MS through the line 169, thus transmitting the start pulse for the beginning of multiplication. After multiplication is complete, which takes only a few milliseconds in presently known electronic computers, energizes the clutch magnet 54 via lines 167 and 168, and thus starts the transfer of the product into the accounting machine 106. As the armature 122 of clutch magnet 54 is attracted, the release of the pawl 52 connects the shaft 18 to the sprocket 60, closing contact 67 via lever 57, this latter contact lying in the motor circuit of the accounting machine. At the same time, the control unit 112 of the accounting machine 106 turns the function shaft 119 to position C. As the connecting link 8 is shifted, the link 10 pushes past pin 11 without encountering any obstacle, and frame 4 remains in its position of rest.

The machine operation that now sets in starts shaft 18 rotating. At the beginning of this rotation, contact 43 is closed by the switching rod 51, actuated by cam 48. This energizes relays C and D, closing contacts $c1$ to $c6$ and $d1$ to $d6$, so that all the pulse channels 148 to 159 are connected in parallel to the contact 44. At the same time as the clutch magnet 54 is energized, the multiplication control unit MS prepares the product storage unit MP for reading out.

As shaft 18 continues to turn, the sensing-pulse generator begins to operate, the cam 47 and lever 49 opening and closing contact 44. The pulses thus generated in the product storage unit MP via the pulse channels actuate the counters of the product storage unit MP, which then contains the quantity "513,282" as the multiplication result. The counters for all digital places are now connected in parallel. Thus, for example, a pulse generated by the pulse transmitter 47, 49, 44 would shift the product storage unit MP to the value "624,393," etc.

After shaft 18 has turned until the first pulse has been generated, shaft 40, driven by the delay coupling drive 45, 46, 98 to 103, begins its rotation clockwise. This rotation lasts until lever 49 has actuated contact 44 ten times via the gearing 105, which consists of ten teeth, thus generating ten pulses. The second pulse shifts the counters of the product storage unit MP to the value "735,404," the counter for the $10^1$ place transmitting a carry-over pulse, which energizes the electromagnet or relay 77 through the line 181, thus pushing the corresponding locking member 42 upward. This locking member 42 engages the teeth 94, preventing the segment 35, associated with the rack 88 provided for the $10^1$ place, from turning. Since the segments 35 lag behind the rotation of the cam 47 with a delay that corresponds to the switching time of the electronic element plus the time required for the electromagnets or relays 76 to 87 to respond, the raised locking member 42 engages the second tooth of the teeth 94. The gear 28 is thus advanced counterclockwise by two teeth, corresponding to an angular value of two, while engaging the associated segment 35 which is thereafter prevented from turning.

Similarly, the other segments 35 are prevented from turning during the following generation of pulses by contact 44, if enough pulses have been fed into the counters of the product storage unit MP for their carry-over pulses to energize the electromagnets 76 to 87 via the lines 171–182. After contact 44 has generated ten pulses, the turning of shaft 40 is completed. The segments 35 that have been locked during this turning have caused the corresponding gears 28 to turn far enough for their angular position to correspond to the decimal complement of the product to be transmitted. The gears corresponding to the places $10^0$ to $10^6$ are thus set to the value "597,828."

In the meanwhile, shaft 18 has turned far enough for lever 23 to be pivoted by the cam 19 (FIG. 7) via lever 21 and the link 22, thus making the cam 69 turn the support 25, so that the gears 28 are disengaged from the segments 35 and meshed with the racks 88. During the ensuing movements of the racks 88 in the direction of the arrow $88a$, the gears 28 are further rotated counterclockwise until the detents 90 strike the zero stops 29, thus preventing further motion of the racks 88. The zero stops 29 are so arranged that they allow no rotation for a gear 28 set to zero angular value, but allow a rotation through nine teeth for a gear 28 set to the angular value "1." Thus the gears 28, set to certain angular values by segments 35, can only be rotated by the amount lacking to complete one rotation, corresponding to the decimal complement of the value set.

Before the shaft 40 is turned back in accordance with the ratchet gear, an additional contact 75 is opened by the shaft 18, so that the relays 76 to 87 are disconnected and the segments 35 are unlocked. The racks 88, whose motion starts at their zero position, are then set to the decimal complement of the value set on the gears 28, so that their numerical setting, after their travel is complete, corresponds to the multiplication product. During the travel of the racks 88, shaft 40 is turned back through the ratchet gear and delayed coupling drive 45, 46, 98 to 103, returning the segments 35 to their position of rest. Shortly before the product is printed by the printing unit 110, the shaft 41 with levers 23 (FIG. 7) is returned to its position of rest via a lever 70 as a result of displacement of the connecting link 8, which engages a stud 71 (FIG. 4), thus again meshing the gears 28 with the segments 35. At the end of the machine operation the storage units MD, MK, and MP are cleared in a known manner by a pulse which returns all sweep steps to their initial position in the electronic computer for the entry of other values.

During the final portion of the rotation of shaft 18, the stud 126 strikes the back of lug 125, releasing the switching member 53 from the lug 124 of the pivoted lever 57, so that it can return to its position of rest, there acting as a stop for the pawl 52, disengaging the latter from the sprocket 60. At the same time, the stud 56 opens contact 67 which then disconnects the drive motor of the accounting machine.

This completes the transfer of the product to the accounting machine, and the apparatus is again in its position of rest, ready for further transmissions.

It should be understood, of course, that the foregoing disclosure relates to only a preferred embodiment of the invention and that it is intended to cover all changes and modifications of the example of the invention herein chosen for the purpose of the disclosure, which do not constitute departures from the spirit and scope of the invention as set forth in the appended claims.

What is claimed is:

1. An apparatus for transmitting quantities between a motor-driven accounting machine and an electronic storage means, said apparatus comprising a frame, a geared calculating rack slidable in said frame and having a plurality of contact teeth arranged thereon in longitudinally spaced relationship, an insulating ball cage movably arranged in said frame for selective positioning in the path of sliding movement of said rack, a contact ball held by said cage and projecting therefrom, a spring in said ball cage, said ball being urged by the restraint of said contact spring toward said teeth for sequential contact therewith when said rack slides past said ball cage, electrical means for producing a pulse upon contact of said teeth on said rack with said ball, a geared segment assigned to an individual digital position of said accounting machine and adapted to rotate through an angle in accordance with a particular value, an electromechanical pulse generator for producing pulses including a rotating toothed cam plate and a pair of electrical contacts responsive to said rotating cam plate, a delay coupling drive for delayed movement of said segment relative to the movement of said cam plate, a gear wheel hingedly supported in said frame and swingable for alternate meshing with said segment and with said rack to transmit values from said geared segment to said storage racks, a cam operatively linked to said rack for coordinate movement therewith, and a cam follower attached to said cage for rolling contact with said cam for selectively contacting said contact ball with said contact teeth.

2. An apparatus as set forth in claim 1, further comprising detent means fixedly connected to said gear wheel, and a stop member pivotally supported in said frame for selective abutment against said detent means when said gear wheel is meshed with said rack.

3. An apparatus as set forth in claim 1, wherein said rack is provided with insulating plate means arranged longitudinally thereon for guiding said contact ball along said teeth.

4. An apparatus as set forth in claim 1, further comprising cam means for actuating swinging movement of said gear wheel, said cam means being adapted to be selectively rotated by the motor drive of said accounting machine.

5. An apparatus as set forth in claim 4, further comprising electromechanical coupling means for selectively connecting said motor drive to said toothed cam plate, to said delay coupling drive and to said cam means for simultaneous rotating movement thereof.

6. An apparatus as set forth in claim 1 wherein said electromechanical pulse generator includes pivotable lever means and switch means, said lever means being adapted to be pivoted by the teeth of said toothed cam plate for sequentially opening and closing said switch means.

7. An apparatus as set forth in claim 1, further comprising locking means slidable in said frame, electromechanical actuating means for positioning said locking means, said geared segment having a first and a second set of gear teeth, and said locking means being selectively positionable for engagement with said first set of gear teeth, said gear wheel being adapted for meshing said second set of gear teeth.

8. An apparatus for transmitting quantities between a motor-driven accounting machine and an electronic storage means, comprising a frame, a calculating rack slidable in said frame and having a plurality of contact teeth arranged thereon in longitudinally spaced relationship, an insulating ball cage movably aranged in said frame for selective positioning in the path of sliding movement of said rack, a contact ball held by said cage and projecting therefrom, a contact spring in said ball cage, said ball being urged by said contact spring toward said teeth for sequential contact therewith when said rack slides past said ball cage, means for generating a control pulse upon contact of said rack with said ball, a rotatable geared segment assigned to an individual digital position in said accounting machine adapted to assume a rotational angle in dependence on said value in the digital position, an electromechanical pulse generator for supplying electric pulses to said electronic storage means whereby said electronic storage means are filled to digital capacity, said pulse generator including a rotating toothed cam plate having teeth thereon whereby electrical contact of each last-named tooth produces said pulses to said electronic storage means, a delay coupling drive for delaying movement of said segment relative to the movement of said cam plate, and a gear wheel hingedly supported in said frame and swingable for alternate meshing with said segment and said rack to transmit values from said segment to said rack.

9. An apparatus for transmitting values between accumulative electronic storage units and racks in bookkeeping machines having an impulse generator scanning said storage units, comprising intermediate storage units for transferring the values from said electronic storage units into said bookkeeping machines, said intermediate storage units including two segments, electromechanical switch elements including circuit means connected to said electronic storage units and to said intermediate storage units to maintain said values in the intermediate storage units when a transmission impulse is received from said electronic storage units, gear means between said racks and said intermediate storage units for transmission of values to said racks, a common drive shaft for said impulse generator and said intermediate storage units for scanning of said electronic storage units and moving said intermediate storage units in dependence thereon, a coupling transmission between said common drive shaft of said impulse generator and said intermediate storage units to stagger the motion of said impulse generator and said intermediate storage units whereby a timed interval between said transmission pulse in the electronic storage unit and the feed of said intermediate storage unit into corresponding position is obtained at high speed, an insulating ball cage mechanism including an insulating ball cage, a contact ball projecting from said ball cage and a contact spring urging said ball into cooperation with contact teeth on said racks, said circuit means connecting said racks and said contact ball to said accumulative electronic storage units to transmit impulses thereto.

10. An accounting machine read-out apparatus for transmitting stored numerical quantities between electronic storage decade units and bookkeeping machine racks having gear teeth thereon, the position of said racks being representative of digital quantities, comprising a rotating mechanical pulse generator for producing a sequence of ten electrical pulses, means for simultaneously transmiting said pulses to each of said electronic storage decade units and for stepping up each of said units, a plurality of rotatable mechanical gear segments the angular position of which is representative of a numerical digit, a delay connecting means for transmitting the rotation of said pulse generator to said gear segments with a delay of rotational displacement therebetwen, a plurality of electromechanical means each connected to one of said storage units and each responsive to the stepipng up of the connected one of said storage unit to its digital capacity, each of said electromechanical means blocking the rotation of one of said gear segments upon said storage unit reaching its digital capacity, whereby the rotation of each of said gear segments is representative of the decade complement of the digit in the corresponding one of said storage units, and means for transmitting said decade complement of the rotation of each of said gear segments to said racks.

11. An accounting machine read-out apparatus for transmitting numerical quantities between electronic storage decade units and racks having gear teeth, the positions of said racks being representative of a digital quantity, comprising an electronic calculator, means for scanning the movement of said racks and transmitting the resulting position of said racks to said calculator, a rotating mechanical pulse generator for producing a sequence of ten electrical pulses, means for transmitting said pulses to each of said electronic storage decade units and for stepping up each of said units, a plurality of mechanical gear segments the angular position of which is representative of a numerical digit, a delay connecting means for transmitting the rotation of said pulse generator to said segments with a delay between their rotational displacement, a plurality of electromechanical means, each connected to one of said storage units and each responsive to the stepping up of the connected one of said storage units, each of said electromechanical means blocking the rotation of one of said segments upon said storage units reaching their digital capacity, whereby the rotation of each of said segments is representative of the decade complement of the digit in each of said storage units, a plurality of spur gears each in engagement with one of said segments, the complete rotation of said spur gears representing ten digits, means for disengaging said spur gears from the engaged one of said segments upon blocking of that segment by said electromechanical means, means for engaging each of said spur gears with one of said racks when the corresponding one of said segments becomes blocked, and means for rotating said spur gears through a complete revolution to transmit to said racks said decade complement of the rotation of each of said segments.

12. An accounting machine as set forth in claim 11, wherein said electromechanical means includes an electromagnet, a bar responsive to the movement of said electromagnet, and wherein said segments include a detent decade adapted to be blocked by said bar.

References Cited in the file of this patent
UNITED STATES PATENTS

| | | |
|---|---|---|
| 928,268 | Muzzy | July 20, 1909 |
| 1,478,419 | Bailey | Dec. 23, 1925 |
| 1,609,155 | Catell | Nov. 26, 1930 |
| 2,332,755 | Robertson et al. | Oct. 26, 1943 |
| 2,757,862 | Boyden et al. | Aug. 7, 1956 |

UNITED STATES PATENT OFFICE
CERTIFICATE OF CORRECTION

Patent No. 3,050,246                          August 21, 1962

Wolfgang Görner et al.

It is hereby certified that error appears in the above numbered patent requiring correction and that the said Letters Patent should read as corrected below.

Column 9, line 46, for "aranged" read -- arranged --; line 56, for "said value in the digital" read -- the digital value in said --.

Signed and sealed this 26th day of March 1963.

(SEAL)
Attest:

ESTON G. JOHNSON                          DAVID L. LADD

Attesting Officer                            Commissioner of Patents